United States Patent
Chamberlain et al.

(10) Patent No.: US 10,754,034 B1
(45) Date of Patent: Aug. 25, 2020

(54) APPARATUS FOR REDIRECTING FIELD OF VIEW OF LIDAR SCANNER, AND LIDAR SCANNER INCLUDING SAME

(71) Applicant: Near Earth Autonomy, Inc., Pittsburgh, PA (US)

(72) Inventors: Lyle J. Chamberlain, Pittsburgh, PA (US); Paul Bartlett, Pittsburgh, PA (US); David Duggins, Pittsburgh, PA (US)

(73) Assignee: Near Earth Autonomy, Inc., Pittsburgh, PA (US)

( * ) Notice: Subject to any disclaimer, the term of this patent is extended or adjusted under 35 U.S.C. 154(b) by 622 days.

(21) Appl. No.: 15/279,849

(22) Filed: Sep. 29, 2016

Related U.S. Application Data
(60) Provisional application No. 62/235,004, filed on Sep. 30, 2015.

(51) Int. Cl.
| | |
|---|---|
| *G01S 17/42* | (2006.01) |
| *G01S 7/481* | (2006.01) |
| *G01S 17/89* | (2020.01) |

(52) U.S. Cl.
CPC ............ *G01S 17/42* (2013.01); *G01S 7/4817* (2013.01); *G01S 17/89* (2013.01)

(58) Field of Classification Search
CPC ...... G01S 7/481; G01S 7/4814; G01S 7/4817; G01S 17/42; G01S 17/89
See application file for complete search history.

(56) References Cited

U.S. PATENT DOCUMENTS

| | | | |
|---|---|---|---|
| 5,663,825 A * | 9/1997 | Amon ................ | G02B 26/0875 250/230 |
| 7,440,084 B2 | 10/2008 | Kane | |
| 8,072,663 B2 | 12/2011 | O'Neill et al. | |
| 8,958,057 B2 | 2/2015 | Kane et al. | |
| 9,063,549 B1 | 6/2015 | Pennecot et al. | |
| 9,128,190 B1 | 9/2015 | Ulrich et al. | |
| 9,285,477 B1 | 3/2016 | Smith et al. | |
| 9,674,415 B2 * | 6/2017 | Wan ................... | H04N 5/23219 |
| 2002/0140924 A1 * | 10/2002 | Wangler .............. | G01S 7/4802 356/28 |
| 2002/0149761 A1 * | 10/2002 | Saccomanno ......... | G01C 5/005 356/5.03 |
| 2016/0377706 A1 * | 12/2016 | Keller ................. | G01S 7/4817 356/5.01 |

FOREIGN PATENT DOCUMENTS

| | | |
|---|---|---|
| WO | WO 2015/189025 A1 | 12/2015 |

* cited by examiner

*Primary Examiner* — Eric L Bolda
(74) *Attorney, Agent, or Firm* — K&L Gates LLP

(57) ABSTRACT

A lidar scanning instrument includes one or more optical elements for redirecting a portion of the output beam sweep of the lidar scanning instrument in a different direction. Three dimensional environment data for both fields of view can be generated. The optical element(s) can be static or moveable, with constant or dynamic motion patterns, to change the direction of the second field of view if desired for the application.

15 Claims, 8 Drawing Sheets

APPARATUS FOR REDIRECTING FIELD OF VIEW OF LIDAR SCANNER, AND LIDAR SCANNER INCLUDING SAME

PRIORITY CLAIM

The present application claims priority to U.S. provisional patent application Ser. No. 62/235,004, filed Sep. 30, 2015, having the same title and inventors as the present application, and which is incorporated herein by reference it is entirety

BACKGROUND

The present invention relates to lidar scanning instruments, which are used to create three dimensional models of environments using an array of single laser range data points. Lidar instruments scan in one of three typical modes. In one mode, a single point sweeps radially, observing a line projected onto the environment. In a second mode, a set of points sweep radially, observing a set of lines projected onto the environment. In a third mode, a point or set of points are swept in two dimensions, observing an area projected onto the environment.

Lidar scanning instruments are often costly, complex, heavy and able to fulfill only a single sensing capability. An instrument is typically dedicated to one purpose, e.g. to observe a portion of the environment in front of a vehicle or to observe the ground below a vehicle. When a system design requires more than one lidar relevant sensing capability, the system budgets such as size, weight, power and cost often prohibit the inclusion of more than one lidar instrument to provide the capabilities. The result is either an increase in system budgets and therefore a decrease in the system's utility, or a limitation in sensing capabilities and therefore limitations in system safety, efficiency and performance.

SUMMARY

In one general aspect, the present invention is directed to a lidar scanning instrument that includes one or more optical elements (e.g., reflectors) for redirecting a portion of the output beam sweep (or field of view) of the lidar scanning instrument in a different direction (or different field of view). That way, three dimensional environment data for both fields of view can be generated with just one output beam, thereby obviating the need for additional lidar scanning units, which can be immensely valuable when system budgets do not permit additional lidar scanning units. Also, the optical element(s) could be moveable, with constant or dynamic motion patterns, to change the direction of the second field of view if desired for the application.

FIGURES

Various embodiments of the present invention are described herein by way of example in connection with the following figures.

DESCRIPTION

Figure 1:
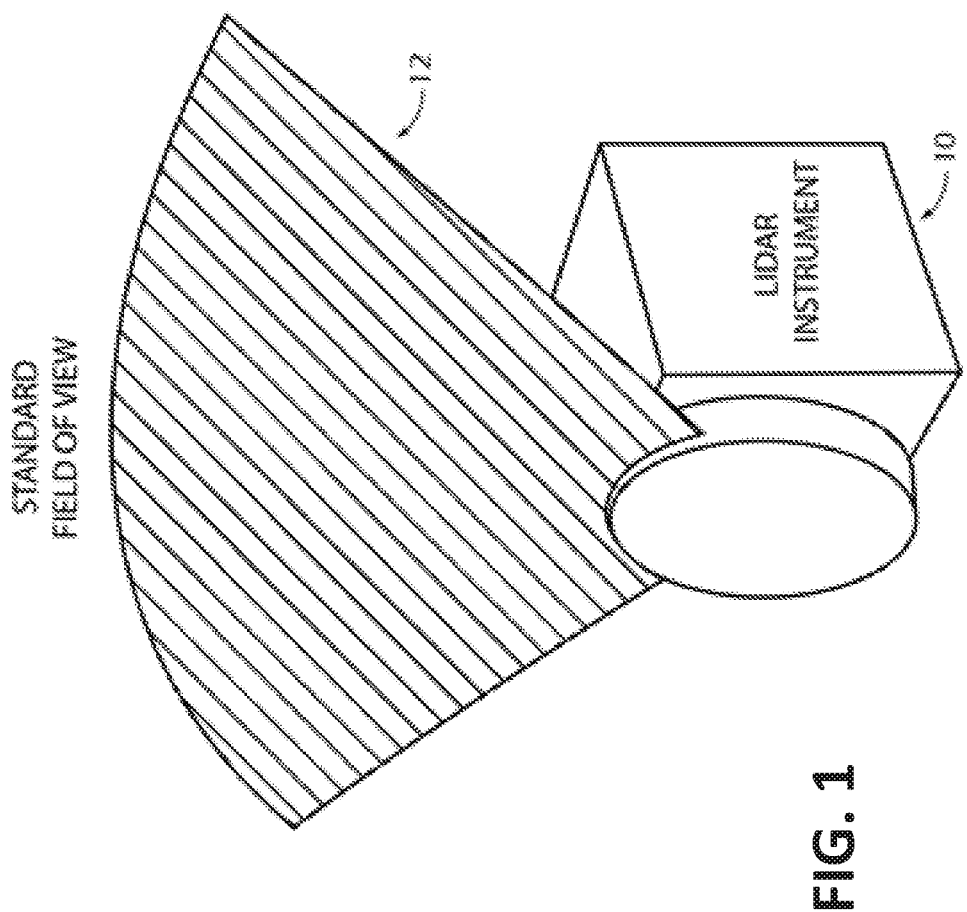
FIG. 1 illustrates a generic lidar instrument.
Figure 9:
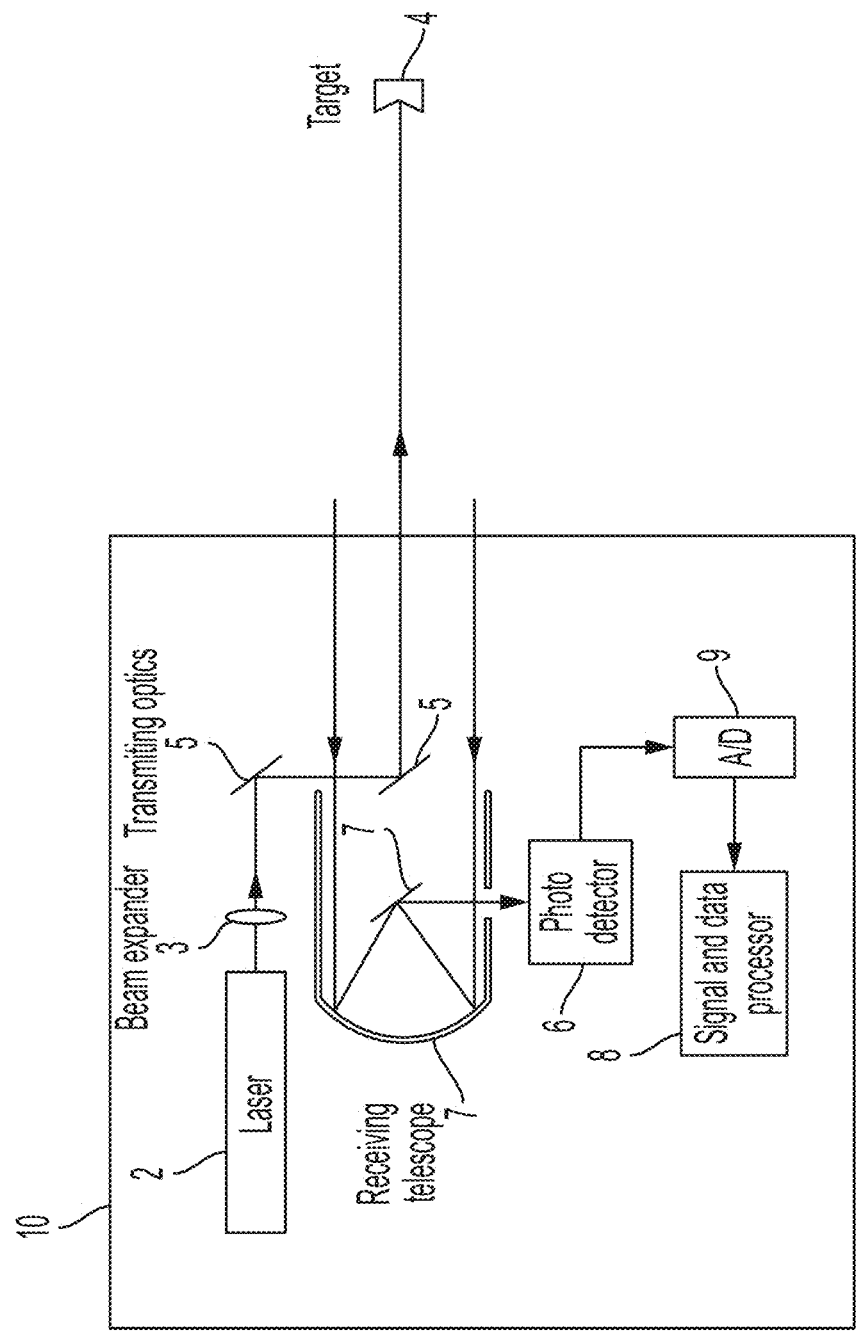
FIG. 9 is a block diagram of a lidar instrument.

A lidar scanning instrument includes at least one light source, usually a laser, that emits a beam of light energy, and a photodetector that detects the light energy reflected back from a target in the environment. The emitted beam is often swept over a field of view by optical elements. FIG. 9 is a diagram of a simple lidar instrument. Light energy from a source 2, in this case a laser (e.g., a semiconductor laser diode), is directed optically toward a target 4 by internal optical components such as a beam expander 3 and mirrors 5. Light energy that is reflected back by the target 4 is directed optically to a photodetector 6 via reflectors 7, and the output of the photodetector 6 can be processed digitally by a signal and data processor 8 after analog-to-digital conversion by a converter 9. FIG. 1 illustrates a generic, prior art lidar instrument mode of operation. In a representative mode of operation, the instrument 10 scans a point radially, observing a line projected into the environment. In this mode, the field of view 12 is in a single plane. In some applications, it is desirous to scan in an additional plane (or multiple additional planes) without having to add an additional lidar scanning unit.

Figure 2:
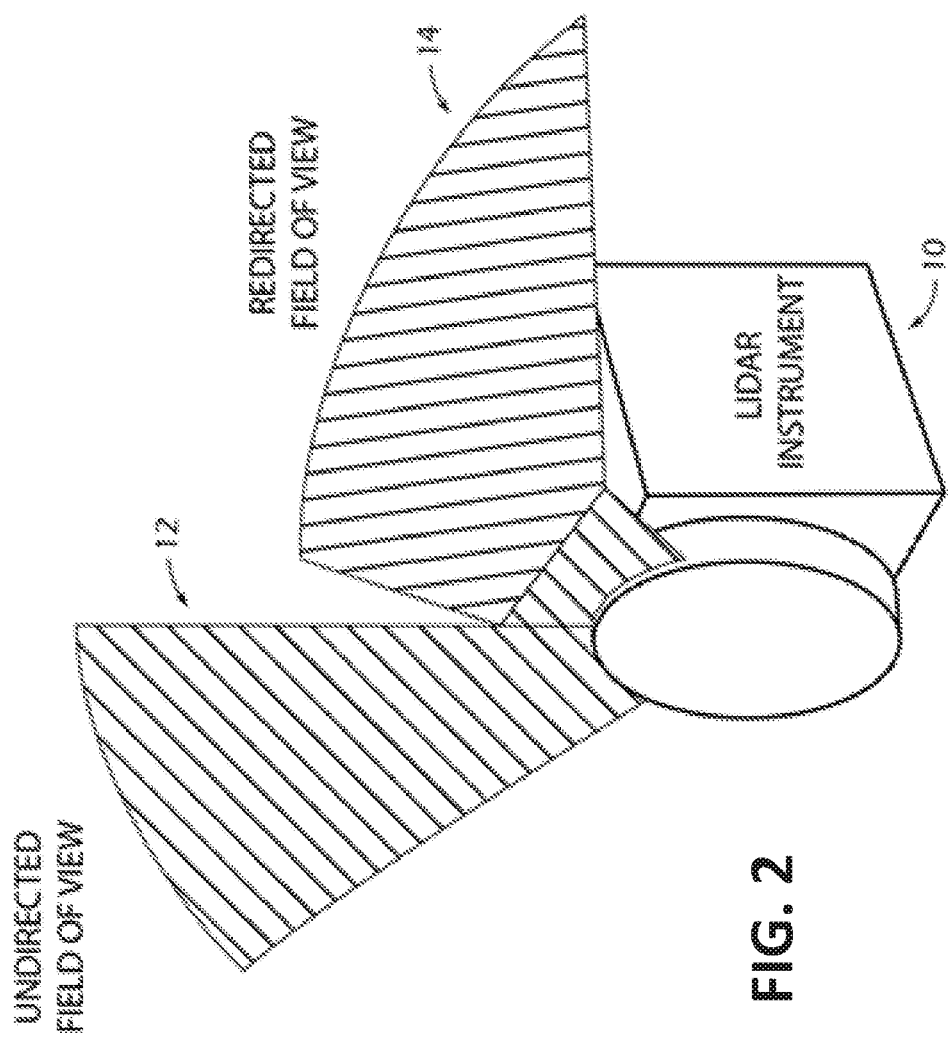
FIG. 2 illustrates a generic lidar instrument with the field of view altered in a manner achievable by the present invention. A portion of the field of view remains unaltered while another portion is redirected.

To do this, according to general aspects of the present invention, as shown in FIG. 2, the lidar beam 12 is redirected for a portion of its sweep cycle to a different plane than the undirected portion of the beam 10. The redirection of the portion of the lidar beam cycle can be effectuated with one or more optical elements, such as reflectors or other type of mirror, lenses, gratings, or any other suitable optical element(s). In the description that follows, it is assumed that the optical element is a reflector, although it should be recognized that the invention is not so limited, and that other optical elements could be used, as just described. The portion or portions of the beam sweep that is redirected by the reflector could be between 0% and 100%, depending on the application. The lidar instrument could have one light source or a plurality of light sources.

Figure 4:
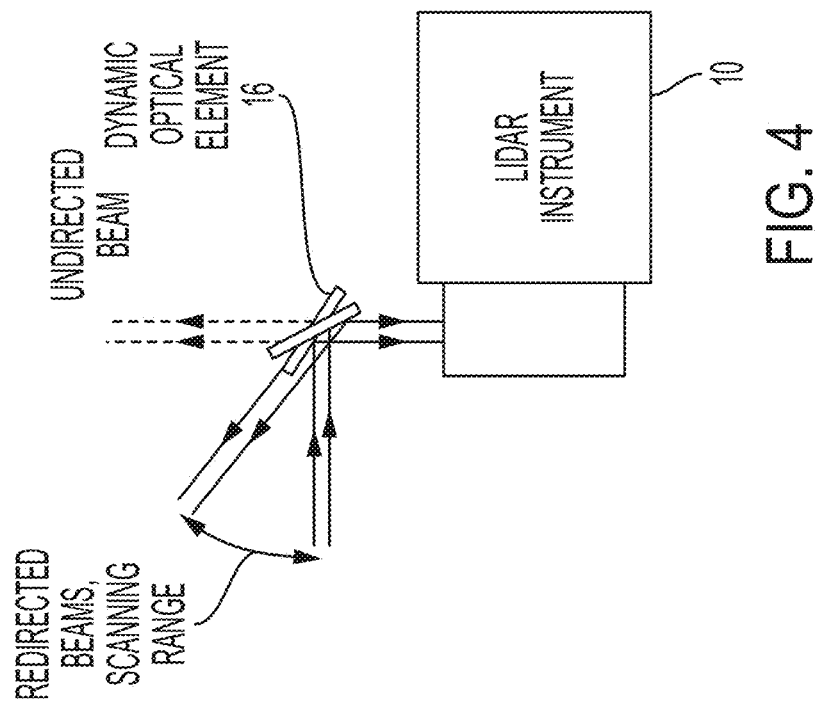
FIG. 4 illustrates an embodiment of the present invention where the field of view is altered with a dynamic optical element. The portion of lidar beams is redirected in a time varying manner, scanning across a range.
Figure 3:
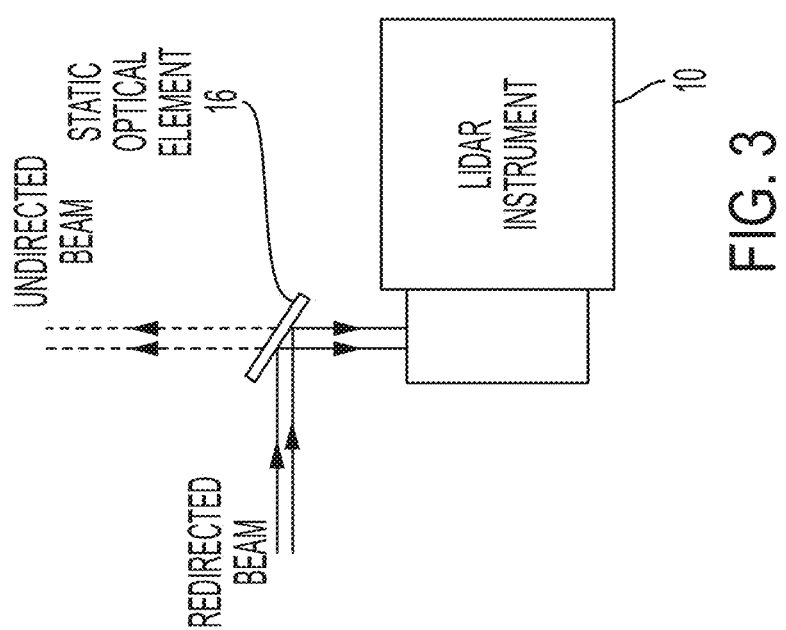
FIG. 3 illustrates an embodiment of the present invention where the field of view is altered with a static optical element. The portion of lidar beams is redirected in a time constant manner.

As shown in FIG. 3, the reflector 16 (or other type of optical element) could be external to the lidar instrument 10. It could also be static or, as shown in FIG. 4, it could be dynamic (moveable). The reflector can be any suitable shape. It can be a flat rectangle or it can assume more complex shapes, such as conical, curved (convex or concave), etc. For embodiments where the reflector is moveable, the laser scanner may also include an actuator to move the reflector, such as stepper motor, or any other suitable actuator. In such embodiments, the moveable reflector may pivot about one or more axes, spin relative to one or more axes, and/or translate in one or more directions, for example. The actuator could move the reflector according to a constant movement pattern or it could be controllable to thereby dynamically control the movement of the reflector. For example, if an onboard computer system determines that additional environment data is needed in a particular direction, the controller could control the actuator to cause the reflector to redirect a portion of the beam in the desired direction.

The reflector 16 and lidar scanning instrument 10 are preferably in a known spatial relationship, such that the position and orientation of the reflector can be known at all times relative to the lidar scanning instrument 10 (and the lidar output beam), preferably with high precision. For example, the reflector could be fixed (e.g., bolted) to the lidar scanning instrument, or they each could be securely fixed to a common frame or chassis, etc. in a fixed spatial relationship.

Figure 5:
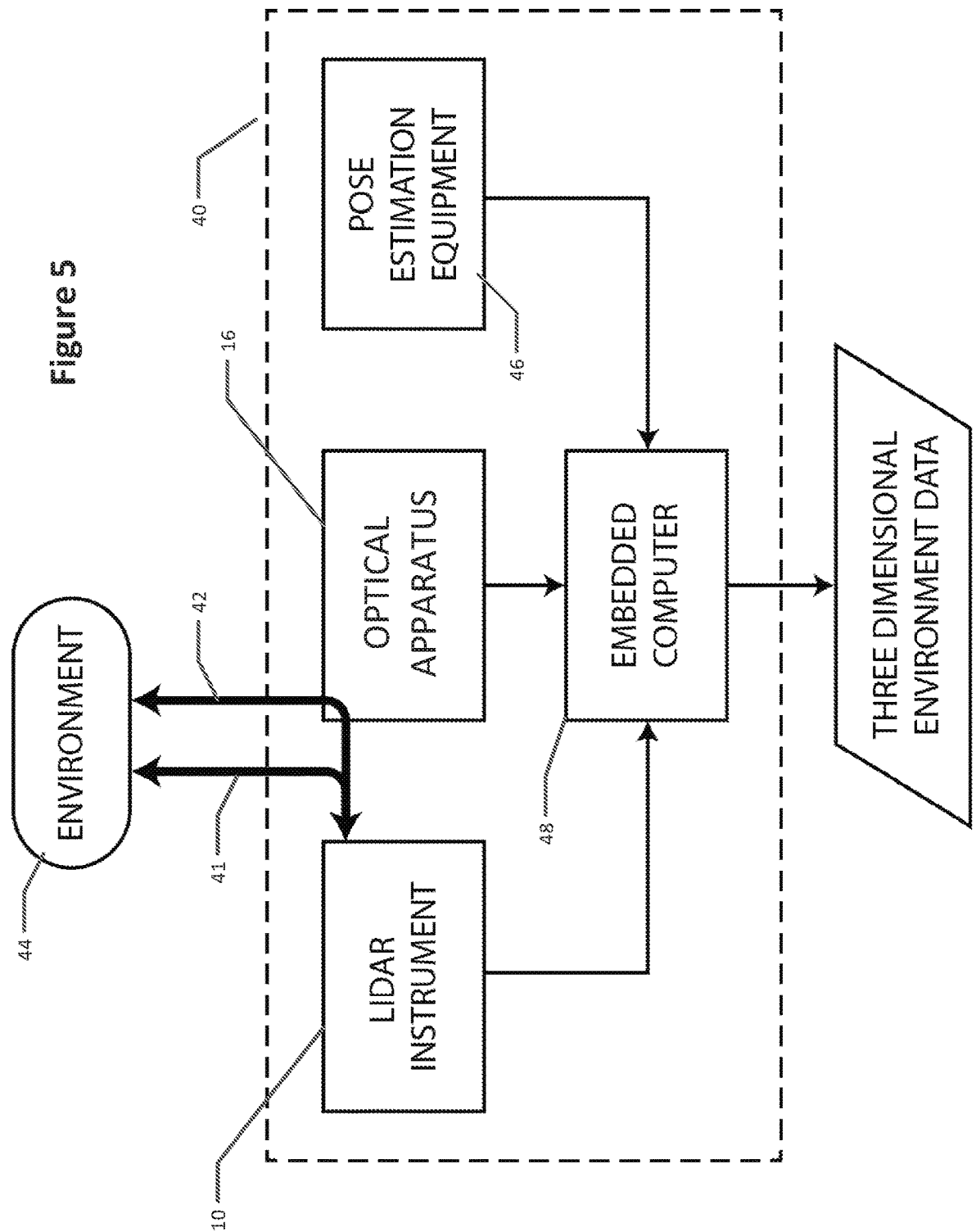
FIG. 5 is a block diagram illustrating a lidar scanning system according to various embodiments of the present invention, including the lidar instrument, an optical reflector, high-precision position and orientation equipment, and a computer system.

FIG. 5 is a simplified block diagram of a lidar scanning system 40 according to various embodiments of the present invention. The system includes the lidar scanning instrument 10 and the reflector 16, with undirected and redirected beams 41, 42 projected onto the environment 44. The system 40 also includes high-precision pose (position and orientation) estimation equipment 46 and a computer system 48 with a high-precision time server. The pose estimation equipment 46 estimates the absolute position and orientation of the system continuously. The pose estimation equipment 46 may comprise an inertial measurement unit (IMU) that includes motion sensors (e.g., accelerometers), rotation sensors (e.g., gyroscopes) and/or magnetometers to continuously calculate the position, orientation, and velocity (direction and speed of movement) of the system. The IMU may also receive and use GPS data to assist in determining the pose of the objects. Such pose estimation equipment can be valuable when the system is part of a moving vehicle, such as a ground or areal vehicle, as explained further below. To that end, the pose estimation equipment 46 can be part of a so-called "state estimation" system for the vehicle that estimates in real-time 6, 9 12 or preferably 15 degrees of freedom (DOF) for the vehicle, such as the (x, y, z, $\phi$, $\theta$, $\psi$, $\dot{x}$, $\dot{y}$, $\dot{z}$, $\dot{\phi}$, $\dot{\theta}$, $\dot{\psi}$, $\ddot{x}$, $\ddot{y}$, $\ddot{z}$), where a single dot indicates the first derivative and double dots indicates the second derivative of the associated value. Other sensors besides an IMU and/or GPS could be used for the state estimation.

In embodiments where the reflector(s) 16 move, the sensors of the pose estimation equipment 46 can also record the pose of the reflector(s) 16 relative to the system. Together, the estimate of the system pose (or state estimation) and the measurement of the reflector pose allow the computer system to calculate where in the vehicle's surrounding environment each lidar beam is directed.

Precise time stamping of lidar data and pose data by the computer system facilitates these geometry calculations. Based on the undirected and redirected lidar readings, the computer system 48 can generate three dimensional data (e.g., a 3D map) for the environment, such as a geo-registered point cloud based on the lidar reflection data.

Figure 6:
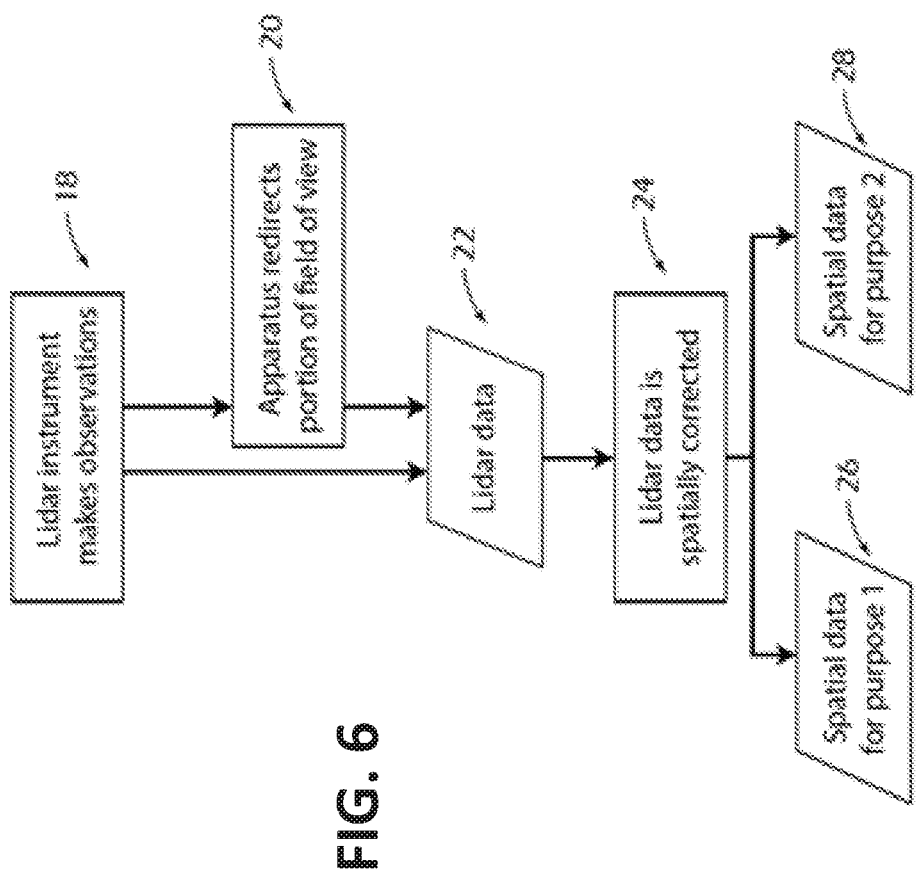
FIG. 6 illustrates the sequence of processes in a static embodiment of the present invention, resulting in spatial data serving two purposes.

FIG. 6 is a flow chart illustrating a process according to embodiments of the present invention using a static reflector 16. At step 18, the lidar instrument 10 makes observations with, as indicated by step 20, the reflector redirecting the beam for a portion of its sweep cycle, such that for a first portion of the sweep cycle (e.g., during a first time period) the lidar beam is not redirected by the reflector, but for a second portion of the sweep cycle (e.g., during a second time period) the lidar beam is redirected by the reflector. The lidar instrument 10 captures all of the incoming lidar readings at step 22, and at step 24 the computer system 48 can spatially correct the lidar data (such as from inertial measurements or GPS data according to known geo-correction techniques). As indicated by steps 26 and 28, the computer system 28 can then generate the spatial data based on the undirected beam data (e.g., "Purpose 1" in FIG. 6) and generate the spatial data based on the redirected beam data (e.g., "Purpose 2"). That is, for example, the computer system 28 can generate a first geo-registered point cloud from the geo-registered lidar data from the time period (the "first" time period) when the lidar beam is undirected, and generate a second geo-registered point cloud from the geo-registered lidar data from the time period (the "second" time period) when the lidar beam is redirected by the reflector(s) 16. Time stamped pose and/or state estimation data from the IMU and/or GPS system can be used to geo-register the lidar data sets.

Figure 7:
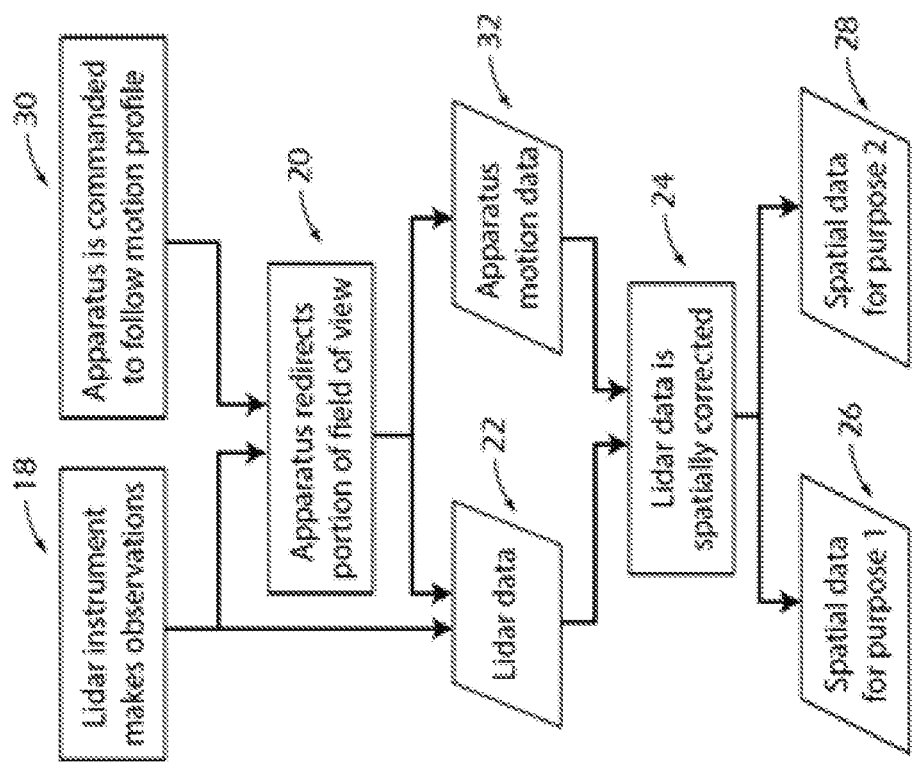
FIG. 7 illustrates the sequence of processes in a dynamic embodiment of the present invention, resulting in spatial data serving two purposes.

FIG. 7 is a flow chart illustrating a process according to embodiments of the present invention using a dynamic reflector 16. FIG. 7 is similar to FIG. 6, except that FIG. 7 includes step 30, wherein the reflector 16 is commanded to follow a motion profile. This can be done with a controllable actuator that moves the reflector 16 according to a constant or dynamic motion profile. The actuator can be controlled by an appropriately programmed computer system or processor. Also, FIG. 7 includes step 32, representing collection of the motion data for the reflector 16. That way, the time-stamped lidar range data can be matched up with the time-stamped reflector pose data to determine (a) whether the reflection data is for a time when the output beam of the lidar unit was redirected or not by the reflector and, if so, (b) the pose of the reflector 16 so that the computer system can determine the direction in which the beam was redirected in order to generate the purpose 2 spatial data at step 28.

The lidar instrument illustrated in FIG. 9 included one output beam and one photodetector (e.g., one channel). More sophisticated lidar instruments can have multiple channels that each scans a horizontal field of view, with the additional channels providing a vertical field of view (e.g., a 30° to 40° vertical field of view). The optical element 16 of the present invention could be used with single or multiple channel lidar instruments. In embodiments where the lidar instrument 10 has multiple channels, the optical element 16 could reflect the output beam for one, some, or all of the channels, depending on the position (either dynamic or static) of the optical element 16 relative to the lidar instrument 10.

Figure 8:
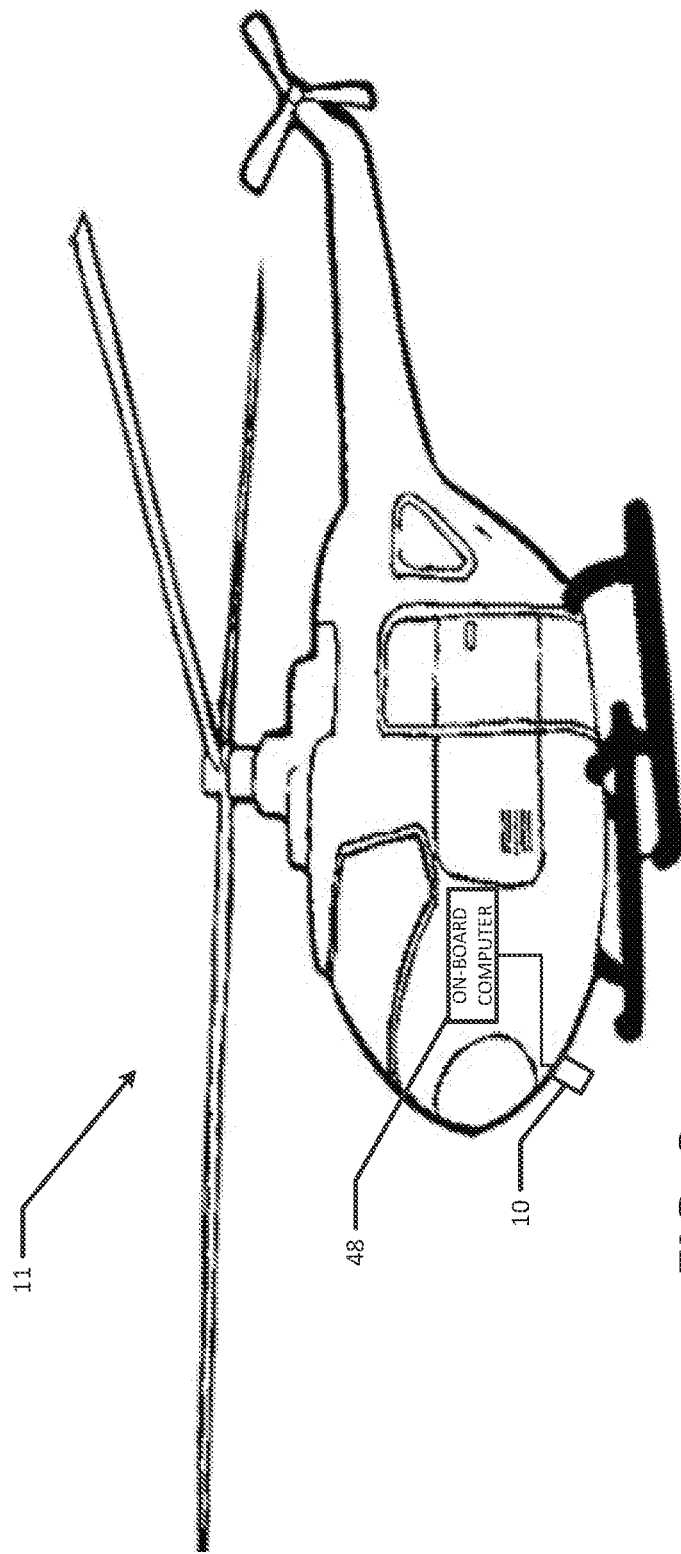
FIG. 8 is a diagram of an air vehicle that that includes the lidar instrument according to various embodiments of the present invention.

The lidar scanning instrument described herein could be used in ground or air vehicles, in a handheld lidar scanning unit, or in a nonmoving (e.g., ground) lidar scanning installation, for example. The ground or air vehicles could be autonomous or nonautonomous (i.e., piloted). For example, a lidar scanning instrument in an aircraft is typically pointed downward to sweep the ground. With implementations of the present invention, one or more reflectors could be used to redirect the lidar beam in a different direction, such as in front of the aircraft and/or to the sides. For example, the lidar scanning instrument could have two reflectors, one on each side of the lidar instrument, to redirect left and right portions of the beam sweep in front and/or to the side of the aircraft, while allowing the center portion of the beam sweep to sweep the ground without redirection. FIG. 8 shows an example of such an air vehicle, in this case a helicopter 100 with the lidar instrument 10 located at the front of the vehicle 11. The reflector 16 is not shown in this diagram for the sake of simplicity. An on-board computer system 48 on the vehicle 100 can be in communication with the lidar scanning instrument 10 and generate the three dimensional environment data for the undirected and redirected beams as described above. Such three dimensional environment data can be used, for example, in navigating the vehicle 11, particularly for an autonomous vehicle. More details about navigating autonomous vehicles based on lidar data (among other things) can be found in U.S. patent application Ser. No. 15/091,661, entitled "Control of Autonomous Rotorcraft in Limited Communication Environments," filed Apr. 6, 2016, and in U.S. patent application Ser. No. 15/152,944, entitled "On-board, Computerized Landing Zone Evaluation System for Aircraft," filed May 12, 2016, both of which are incorporated herein by reference in their entirety and both of which, along with the present application, are assigned to Near Earth Autonomy, Inc.

In an embodiment where the lidar instrument is installed on a ground or air vehicle, the vehicle may include propulsion and steering systems. For an aircraft, the propulsion system(s) may include engines, motors, propellers, propulsive nozzles, and rockets, for example. The steering systems may include propeller blade pitch rotators, rudders, elevators, ailerons, etc. For an autonomous aircraft, an autonomous flight control system controls the propulsion and steering systems based on computer-generated, dynamic flight plans that are generated and updated in real-time during flight based on, in part, the three dimensional data generated by the lidar apparatus. The three dimensional data generated by the lidar apparatus of the present invention can be used to detect objects in the surrounding vicinity of the aircraft, evaluate landing zones, etc. The three dimensional data could also be used to generate a map of the terrain, using either an autonomous or nonautonomous aircraft.

In one general aspect, therefore, the present invention is directed an apparatus comprising a lidar instrument 10 and at least one optical reflector 16. The lidar instrument 10 scans output light energy from at least one light energy source 2 across a first field of view, and includes a photodetector 6 for detecting reflected light energy that is reflected back to the lidar instrument 10. The at least one optical element 16 is external to, and in a fixed spatial relationship with, the lidar instrument 10 such that the at least one optical element 16 redirects a portion of the output light energy from the light energy source 2 across a second field of view that is different from the first field of view.

In various implementations, the at least one optical element comprises at least one reflector, which may be implemented as a mirror, lens or grating, for example. Also, the at least optical element may comprise at least one flat, rectangular optical element, at least one conical optical element, or at least one curved optical element. In addition, the apparatus may further comprise an actuator for moving the at least one optical element 16 to dynamically change the direction of the second field of view. The actuator may comprise a stepper motor. The actuator may be for pivoting, spinning or translating the at least one optical element.

In various implementations, the apparatus may further comprise a computer system 48 that is in communication with the lidar instrument 10. The computer system may be programmed to: (i) generate first three dimensional data (e.g., a first point cloud) based on reflected light energy when the output light energy is not redirected by the at least one optical element; and (ii) generate second three dimensional data (e.g., a second point cloud) based on reflected light energy when the output light energy is redirected by at least one optical element. In addition, the apparatus can further comprises one or more sensors (e.g., an IMU) for determining position and orientation data for the at least one optical element. The sensor(s) are in communication with the computer system and the computer system can determine the first and second three dimensional data based on the position and orientation data from the one or more sensors. The computer system may also be programmed to time stamp the position and orientation data for the at least one optical element as well as time stamp output of the photodetector of the lidar instrument. To that end, the computer system can then use the time stamped position and orientation data for the at least one optical element and the time stamped photodetector output in generating the first and second three dimensional data.

A method according to the present invention can comprise the steps of: (a) for a first time period, scanning output light energy from a lidar instrument across a first field of view; (b) for a second time period, redirecting, by at least one optical element, the output light energy from the lidar instrument across a second field of view that is different from the first field of view, where the at least one optical element is external to and in a fixed spatial relationship with the lidar instrument; (c) generating, by a computer system that is in communication with the lidar instrument: (i) first three dimensional data based on reflected light energy sensed by the lidar instrument during the first time period; and (ii) generate second three dimensional data based on reflected light energy sensed by the lidar instrument during the first time period.

In various implementation, the method may further comprise the steps of, during the second time period, moving the at least one optical element to dynamically change the direction of the second field of view and sensing the position and orientation of the at least one optical element with one or more sensors. In such an embodiment, the step of generating the second three dimensional data can additionally comprise the step of accounting for the position and orientation of the at least one optical element during the second time period.

In another general aspect, the present invention is directed to a vehicle that comprises a propulsion system for propelling the vehicle and an apparatus for sensing an environment around the vehicle. The apparatus comprises the lidar instrument and the above-described optical element that is external to, and in a fixed spatial relationship with, the lidar instrument, such that the at least one optical element redirects a portion of the output light energy from the light energy source across a field of view that is different from the field of view of the lidar instrument alone without redirection by the at least one optical element. In various embodiments, the apparatus may further comprise a computer system in communication with the lidar instrument, where the computer system is programmed to generate the above-described first and second three dimensional data based on reflected light energy.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein.

The functions of the various computer systems described herein may be implemented in computer software using any suitable computer programming language such as .NET, SQL, MySQL, HTML, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl. Such software may be stored on any type of suitable computer-readable medium or media such as, for example, solid state, magnetic or optical storage medium.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. Further, while various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An apparatus comprising,
a lidar instrument configured to sweep output light energy across a first field of view, wherein the lidar instrument includes:
at least one light energy source configured to output light energy,
an internal optical scanning element configured to direct output light energy out of the lidar instrument across the first field of view; and
a photodetector for detecting reflected light energy that is reflected back to the lidar instrument;
at least one optical element that is external to the lidar instrument, wherein the at least one optical element is configured to redirect at least a portion of the output light energy from the light energy source across a second field of view that is different from the first field of view, such that for a first portion of the sweep, the lidar instrument directs light energy across the first field of view and for a second portion of the sweep, the at least one optical element redirects at least a portion of the output light energy across the second field of view; and
a computer system in communication with the lidar instrument, wherein the computer instrument is programmed to:
determine whether reflected light energy detected by the at least one photodetector is from the first field of view, based on, at least in part, data associated with a position and orientation of the at least one optical element;
generate first three dimensional data based on reflected light energy when the output light energy is from the first field of view; and
generate second three dimensional data based on reflected light energy when the output light energy is from the second field of view.

2. The apparatus of claim 1, wherein the at least one optical element comprises at least one reflector.

3. The apparatus of claim 2, wherein the at least one reflector comprises a mirror.

4. The apparatus of claim 2, wherein the at least one reflector comprises a lens.

5. The apparatus of claim 2, wherein the at least one reflector comprises a grating.

6. The apparatus of claim 1, wherein the at least optical element comprises at least one flat, rectangular optical element.

7. The apparatus of claim 1, wherein the at least optical element comprises at least one conical optical element.

8. The apparatus of claim 1, wherein the at least optical element comprises at least one curved optical element.

9. The apparatus of claim 1, further comprising an actuator for moving the at least one optical element to dynamically change the direction of the second field of view.

10. The apparatus of claim 9, wherein the actuator is for pivoting the at least one optical element.

11. The apparatus of claim 9, wherein the actuator is for spinning the at least one optical element.

12. The apparatus of claim 9, wherein the actuator is for translating the at least one optical element in one or more directions.

13. The apparatus of claim 9, further comprising:
one or more sensors for determining position and orientation data for the at least one optical element.

14. The apparatus of claim 13, wherein the one or more sensors comprises an IMU.

15. The apparatus of claim 14, wherein the computer system is programmed to:
time stamp the position and orientation data for the at least one optical element;
time stamp output of the photodetector of the lidar instrument; and
use the time stamped position and orientation data for the at least one optical element and the time stamped photodetector output in generating the first and second three dimensional data.

* * * * *